US009852375B2

(12) United States Patent
Sanjay et al.

(10) Patent No.: US 9,852,375 B2
(45) Date of Patent: Dec. 26, 2017

(54) TECHNIQUES FOR MOBILE PREDICTION (71) Applicant: Intel Corporation, Santa Clara, CA (US)

(72) Inventors: Addicam V. Sanjay, Gilbert, AZ (US); Jose A. Avalos, Chandler, AZ (US); Joe D. Jensen, Chandler, AZ (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/583,524

(22) Filed: Dec. 26, 2014

(65) Prior Publication Data
US 2016/0189038 A1  Jun. 30, 2016

(51) Int. Cl.
G06F 17/00 (2006.01)
G06N 7/00 (2006.01)
G06N 7/08 (2006.01)
G06N 5/04 (2006.01)

(52) U.S. Cl.
CPC ..................... G06N 5/04 (2013.01)

(58) Field of Classification Search
CPC .......... G06N 5/02; G06N 5/022; G06F 17/03
USPC ........................................................ 706/55
See application file for complete search history.

(56) References Cited

U.S. PATENT DOCUMENTS

| | | | | |
|---|---|---|---|---|
| 6,115,476 A * | 9/2000 | O'Conner | ............ | H04N 17/045 348/180 |
| 7,562,364 B2 * | 7/2009 | Sanjay | ................. | G06F 9/4881 709/207 |
| 2005/0149608 A1 * | 7/2005 | Sanjay | .................. | G06F 9/4881 709/200 |
| 2008/0004021 A1 * | 1/2008 | Sanjay | ................ | H04L 12/2838 455/436 |
| 2009/0190729 A1 | 7/2009 | Chakraborty et al. | | |
| 2011/0218951 A1 | 9/2011 | Kline et al. | | |
| 2012/0284080 A1 | 11/2012 | DeOliveira et al. | | |
| 2013/0226856 A1 | 8/2013 | Zhang et al. | | |
| 2013/0339156 A1 * | 12/2013 | Sanjay | .................. | G06Q 30/02 705/14.66 |
| 2013/0342689 A1 * | 12/2013 | Sanjay | .................. | H04N 7/183 348/143 |
| 2014/0006129 A1 * | 1/2014 | Heath | ................ | G06Q 30/0222 705/14.23 |
| 2014/0095306 A1 * | 4/2014 | Avalos | ............... | G06Q 30/0255 705/14.53 |
| 2014/0365494 A1 | 12/2014 | Gangavaram et al. | | |
| 2015/0294221 A1 * | 10/2015 | Andres Gutierrez | | ........................... G06Q 30/0261 706/46 |
| 2016/0189038 A1 * | 6/2016 | Sanjay | ..................... | G06N 5/04 706/55 |
| 2016/0239874 A1 * | 8/2016 | Avalos | ............... | G06Q 30/0255 |

(Continued)

OTHER PUBLICATIONS

Quora—Directed Acyclic Graph creation and execution, Mar. 10, 2015, Quora.*

(Continued)

*Primary Examiner* — Michael B Holmes (57) ABSTRACT

An apparatus and method for mobile prediction is disclosed. In an embodiment, a predictive component creates graphs of user behaviors and receives subgraphs derived from a global graph. By combining a subset of the user behavior graph and the subgraph, a user behavior is predicted. Other embodiments are described and claimed.

23 Claims, 6 Drawing Sheets

(56) References Cited

U.S. PATENT DOCUMENTS

| | | | | |
|---|---|---|---|---|
| 2016/0379251 A1* | 12/2016 | Sanjay | ............... | G06Q 30/0255 |
| | | | | 705/14.53 |
| 2016/0379261 A1* | 12/2016 | Avalos | ............... | G06Q 30/0261 |
| | | | | 705/14.58 |
| 2017/0013003 A1* | 1/2017 | Samuni | ............... | H04L 63/1425 |
| 2017/0091540 A1* | 3/2017 | Wu | ..................... | G06K 9/00369 |
| 2017/0177739 A1* | 6/2017 | Algotar | ............. | G06F 17/30958 |

OTHER PUBLICATIONS

Code to construct a graph—Jan. 11, 2014, google search.*

Design and implementation of the mobile fire alarm system using wireless sensor networks Karwan Muheden; Ebubekir Erdem; Sercan Vançin 2016 IEEE 17th International Symposium on Computational Intelligence and Informatics (CINTI) Year: 2016 pp. 000243-000246, DOI: 10.1109/CINTI.2016.7846411 IEEE Conference Publications.*

A Predictive Protocol for Mobile Context Updates with Hard Energy Constraints Stefan Föll; Florian Berg; Klaus Herrmann; Kurt Rothermel 2012 IEEE 13th International Conference on Mobile Data Management Year: 2012 pp. 125-130, DOI: 10.1109/MDM.2012.11 IEEE Conference Publications.*

Primary user activity prediction based joint topology control and stable routing in mobile cognitive networks Yan Xue; Can Tang; Feilong Tang; Yanqin Yang; Jie Li; Minyi Guo; Jinsong Wu 2016 IEEE Wireless Communications and Networking Conference Year: 2016 pp. 1-6, DOI: 10.1109/WCNC.2016.7564910 IEEE Conference Publications.*

Human-in-the-Loop Mobile Networks: A Survey of Recent Advancements Lingjie Duan; Longbo Huang; Cedric Langbort; Alexey Pozdnukhov; Jean Walrand; Lin Zhang IEEE Journal on Selected Areas in Communications Year: 2017, vol. 35, Issue: 4 pp. 813-831, DOI: 10.1109/JSAC.2017.2695738 IEEE Journals & Magazines.*

International Search Report and Written Opinion received for PCT Patent Application No. PCT/US2015/064970, dated Mar. 29, 2016, 13 pages.

* cited by examiner

TECHNIQUES FOR MOBILE PREDICTION

BACKGROUND

Online advertising has become a common phenomenon, and it is continually developing as the Internet and other computing platforms, systems, languages, and components develop. As with other media such as television, radio, or magazines, it is a continual challenge to present effective advertising. Mobile devices have also become more common, and they, too, are continually developing. Presenting interesting, relevant, and effective information to users of mobile devices is also a continual challenge. In addition, mobile devices can typically connect to networks and the Internet, and increasingly can assist the user with various tasks such as scheduling, navigating, sports training, sleeping, traveling, etc. As such, there is a need for more effective selection of information presented to the mobile user.

DETAILED DESCRIPTION

Various embodiments are generally directed to predicting user behavior. Some embodiments are particularly directed to predicting behavior or activity of a user ("user activity" or "user behavior") of a mobile device based on a combination of at least some portions of a user activity graph and a global graph. In one embodiment, for example, the user activity may be predicted based on a user activity graph and a global subgraph of the global graph. A user activity graph is, in various embodiments, populated with user behaviors and mobile device activity such as web surfing, taking photos, traveling and the like. A global graph is similarly populated, but includes information from a larger number of users such as the total number of mobile device users. A global subgraph is a selected subset of the global graph that is particularly relevant to a particular user, user activity, user activity graph, mobile device, or other criteria. The user activity graph and the global graph may comprise nodes representative of user behavior and mobile device activity. Information for the graphs may be derived, for example, from a product-keyword association or other classifying techniques.

In one embodiment, for example, a predictive component creates one or more graphs of user behaviors and also receives information from a global graph, such as from one or more subgraphs derived from the global graph. By combining information from a subset of the user behavior graph and the one or more subgraphs, a user behavior may be predicted. In some cases, the predicted user behavior may have parameters associated with it, such as a time parameter to indicate a time frame within which the predicted user behavior may occur, a probability parameter to indicate a statistical probability that the predicted user behavior may occur, and so forth. An electronic device, such as a mobile computing device, may utilize the predicted user behavior to take subsequent actions, such as control device elements (e.g., power, settings, hardware, software, etc.), present user interface views for a software application, modify user interface views (e.g., present different controls), perform automated operations (e.g., authentication, authorization, payment, manage network connections, etc.), and other actions suitable for a mobile computing device. As a result, the embodiments can improve affordability, scalability, modularity, extendibility, or interoperability for an operator, device or network.

With general reference to notations and nomenclature used herein, the detailed descriptions that follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers, special purpose digital computers, or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

Figure 1:
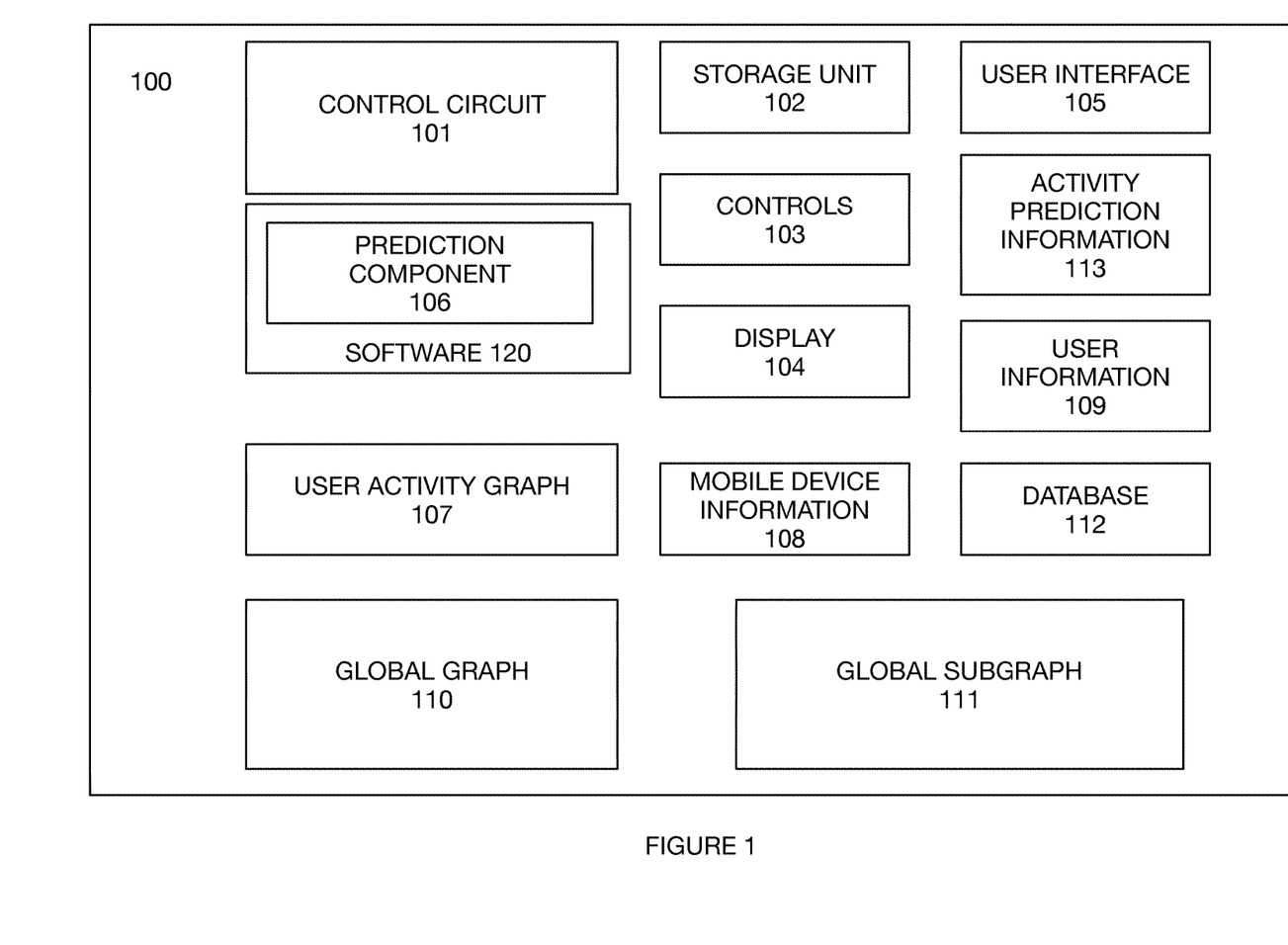
FIG. 1 is a block diagram of an embodiment of a mobile prediction apparatus.

FIG. 1 illustrates a block diagram for a system 100. In one embodiment, the system 100 may comprise a computer-implemented system 100 having a software application 120 comprising one or more components. For example, in FIG. 1, a prediction component 106 is implemented as a software application 120. However, the prediction component 106 may also be implemented in firmware, hardware, or other circuitry. Embodiments are not limited in this context.

In various embodiments, the system 100 may be implemented in an electronic device, such as one or more of the electronic devices described with reference to FIG. 5. Although the system 100 shown in FIG. 1 has a limited number of elements in a certain topology, it may be appreciated that the system 100 may include more or less elements in alternate topologies as desired for a given implementation.

As shown in FIG. 1, the system 100 may include one or more control circuits 101. In various embodiments, a control circuit 101 may comprise or be implemented as any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

The system 100 may include one or more storage units 102. In various embodiments, a storage unit 102 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these might comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages might be made up of multiple storage components based on identical storage technology, but which may be maintained separately as a result of specialization in use (e.g., some DRAM devices employed as a main storage while other DRAM devices employed as a distinct frame buffer of a graphics controller).

The system 100 may include one or more controls 103. In various embodiments, a control 103 may comprise any of a variety of types of manually operable controls, including physical controls and virtual controls (e.g., software controls presented on a touchscreen). Examples may include without limitation, lever, rocker, pushbutton or other types of switches; rotary, sliding or other types of variable controls; touch sensors, proximity sensors, heat sensors or bioelectric sensors, etc. The controls 103 may comprise any of a variety of non-tactile operator input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture, etc.

The system 100 may include one or more electronic displays 104. In various embodiments, a display 104 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing devices 100 and 500, or may be disposed on a separate casing of a physically separate component of corresponding ones of these computing devices (e.g., a flat panel monitor coupled to other components via cabling).

The system 100 may store various types of information, such as mobile device information 108. In various embodiments, mobile device information 108 may comprise any physical or measurable parameter that can be captured and stored by the system 100. For example, and without limitation, mobile device information might include temperature, ambient light level, which applications are installed, system settings, and location.

The system 100 may also store other types of information, such as user information 109. In various embodiments, user information 109 may comprise information any personal information that could be used in a demographic model. For example, and without limitation, user information 109 might include a user's name, browsing history, whether and to what extent the user performs financial transactions on system 100, how much email a person receives, how much email a person sends, security information, personal information, authentication information, authorization information, financial information, user profile information, and the like.

The system 100 may store various types of information organized into certain data schemas, data structures, or presentation modalities. In one embodiment, for example, information may be stored in the form of one or more user activity graphs 107. In one embodiment, for example, information may be stored in the form of one or more global subgraphs 111 and/or global graphs 110.

A user activity graph 107 may generally comprise nodes that include descriptions of user behavior. For example, and without limitation, the user activity graph may include multiple nodes representing items such as incoming call, outgoing call, walk, review article, play game, data usage, and the like. Furthermore, the nodes may be connected by edges according to some defined relationship between nodes, such as hierarchical relationships, for example.

A global graph 110 may generally comprise a collection of a very large number of user activity graphs. The global graph 110 may contain, like the user activity graph 107, and without limitation, items such as incoming call, outgoing call, walk, review article, play game, and the like.

A global subgraph 111 may generally comprise a defined portion of a global graph 110, such as a specific set of nodes and edges within the entire set of nodes and edges.

In general operation, the system 100 may be implemented as part of an electronic device, such as a mobile device, for example. In one embodiment, the control circuit 101 may be coupled to the storage unit 102. The storage unit 102 may store one or more software components for a software application 120, such as the user interface component 105 and/or the prediction component 106.

When executed by the control circuit 101, the prediction component 106 may analyze a set of input information associated with a user, location or device, and output activity prediction information 113 derived from the set of input information. In one embodiment, for example, the prediction component 106 may receive as input information about a user or a mobile device, such as including but not limited to a user activity graph 107, mobile device information 108, user information 109, a global graph 110 and/or a global subgraph 111. In general, the mobile device information 108 represents information about the mobile device implementing the prediction component 106, and the user information 109 represents information about the user of the mobile device implementing the prediction component 106. In general, the user activity graph 107, the global graph 110 and the global subgraph 111 represent historical user activity or user behavior for one or more users. For instance, the user activity graph 107 may represent historical user activity or user behavior for a user of a mobile device executing the prediction component 106. The global graph 110 may represent historical user activity for a number of different users of different devices other than, or outside of, the mobile device executing the prediction component 106. The prediction component 106 may take the input information, analyze the input information, and output a set of activity prediction information 113. Operation of the prediction component 106 in analyzing the input information may be described in more detail with reference to FIG. 2.

The activity prediction information 113 may represent a prediction of future user activity or user behavior for a user of the mobile device executing the prediction component 106. In various embodiments, the activity prediction information 113 may comprise a specific action predicted for a user, such as preparing to send a text message, make a telephone call, or launch a software application. In some cases, the activity prediction information 113 may have various prediction parameters associated with it, such as time parameter (e.g., when is a specific action predicted to occur), a probability parameter (e.g., a statistical probability that a specific action is to occur), a conditional parameter (e.g., if a user moves the mobile device in a certain direction, then the user will likely make a call), and other parameters. It may be appreciated that these are merely a few examples of potential parameters that may be used to augment or enhance the activity prediction information 113, and others may exist as well dependent on a particular use case scenario. The embodiments are not limited in this context.

The activity prediction information 113 may be used as input to other components of the mobile device, such as the user interface 105, a software application 120 resident on the mobile device, or various hardware platform components (e.g., power supply, input/output (I/O) device, transceiver, etc.). Examples of a software application 120 may include without limitation a software application implemented as an intelligent personal assistant or knowledge navigator (e.g., Siri® by Apple Inc.®), an operating system (OS) application, a productivity application, a communications application (e.g., messaging application, call management application, etc.), or other software applications. These and other components may use the activity prediction information 113 to customize software or hardware elements of the mobile device to enhance performance and user experience.

When executed by the control circuit 101, the user interface component 105 may generate, render and/or present a user interface view on the display 104. The user interface view may provide a number of user interface elements to present activity prediction information 113. The activity prediction information 113 may comprise, for example, predictions of user activity or user behavior as generated from one or more of the user activity graph 107, the global graph 110, and the global subgraph 111, as described in more detail with reference to FIG. 2. In one embodiment, the user interface component 105 may receive activity prediction information 113, and generate a user interface message for a user. For instance, the user interface message may present a string such as:

"It appears that you are interested in a product. There are seven stores nearby that sell that product. Would you like to call one of those stores?"

Additionally or alternatively, the activity prediction information 113 may comprise a set of custom user interface elements that are dynamically selected based on predictions of user activity or user behavior as generated from one or more of the user activity graph 107, the global graph 110, and the global subgraph 111. In one embodiment, the user interface component 105 may receive the activity prediction information 113, and generate a set of custom controls 103 based on the activity prediction information 113. For instance, if the activity prediction information 113 indicates that a user is likely to make a telephone call, then the user interface component 105 may generate a custom control 103 of an icon to trigger a call management application (not shown). This allows the user to conveniently access the call management application, the controls of which may be located in a different portion of the user interface view, or in another user interface view entirely.

Figure 2:
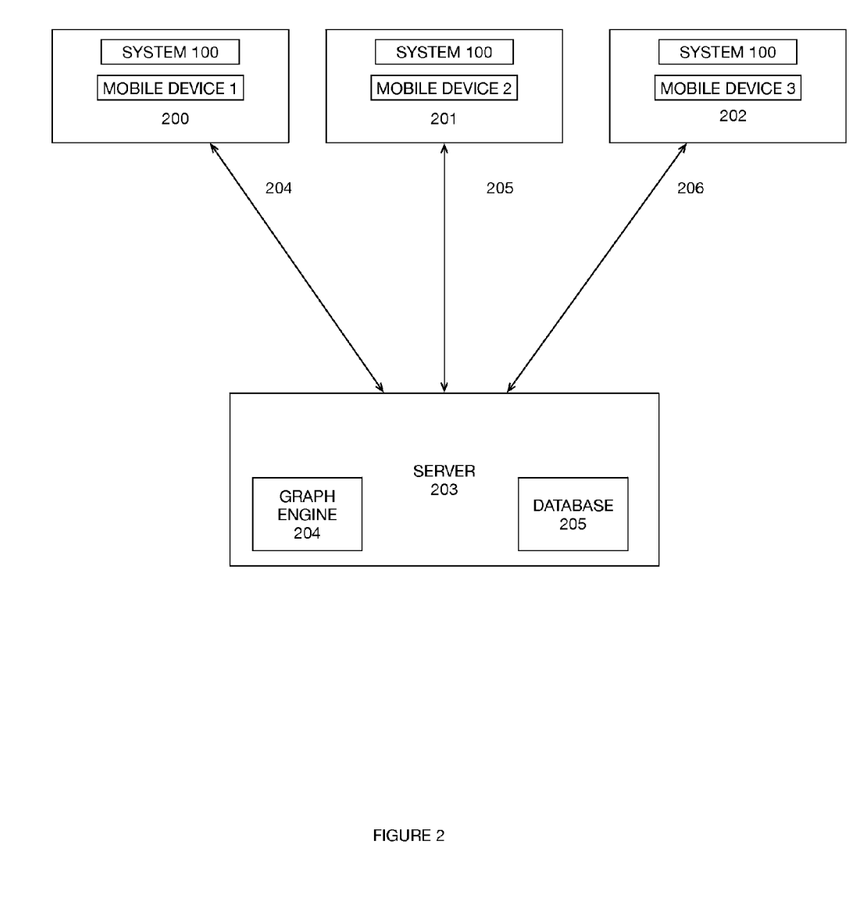
FIG. 2 is block diagram of a second embodiment of a mobile prediction apparatus.

FIG. 2 illustrates an embodiment of a system 200 suitable for implementing the system 100 described with reference to FIG. 1. As depicted in FIG. 2, the mobile devices 200-202 and the server 203 may exchange signals conveying user information, such as user activity graphs 107 and global subgraphs 111, via a set of communications links 204-206, respectively. Each of the links 204-206 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. It is envisioned that one or more of these links are implemented as channels of communication (e.g., virtual private network (VPN) channels or other forms of virtual channels) formed between computing devices through portions of a public network (e.g., the Internet) or a private network (e.g., an intranet).

In various embodiments, and as will be explained in greater detail, a user of one of the mobile devices 200-202 may use the mobile device to engage in online activities involving interactions directly with the mobile device 200-202, and/or between the mobile devices 200-202 and one or more servers through a network, such as the server 203 through the links 204-206. Examples of such interactions may include without limitation configuring a mobile device, setting user preferences, browsing a website hosted by the server 203, requesting the server 203 to perform a financial or other transaction, sending and/or receiving messages (e.g., text, chat, short message service (SMS), multimedia message service (MMS), email, video, audio, tactile, olfactory, and other communications modalities) through the server 203, searching for information employing a search routine executed by the server 203, and other measurable user activity. As the user operates one of the mobile devices 200-202 to engage in online activities, data concerning these online activities such as IP addresses of servers interacted with, uniform resource locators (URLs) of websites visited, metadata, etc. are monitored and stored by the particular mobile device, ultimately becoming included in mobile device information 108 and user information 109. Also, user input such as strings of alphanumeric terms searched employing search routines, names of locations entered while using online maps, etc. are monitored and included in mobile device information 108 and user information 109 (as shown in FIG. 1.) Further, one or more of the mobile devices 200-202 may include location based devices, such as a global positioning system (GPS) interface to receive wireless signals emanating from satellites or other wireless devices (e.g., access points, base stations, enhanced node B (eNodeB), etc.) to aid in determining where the mobile device is carried by the user, and such location data may also be included in mobile device information 108 and user information 109.

In executing a sequence of instructions, the control circuit 101 may generate or manage the controls 103 and/or the display 104. In one embodiment, the control circuit 101 may execute a user interface component 105 to generate and present a user interface (not shown) on the display 104. The user interface may enable the user to interact or otherwise use the mobile device to engage in online interactions with other computing devices (e.g., the server 203) through the mobile device. As these online interactions take place, the control circuit 101 may monitor the controls 103 (e.g., where the controls 103 may comprise, without limitation, a keyboard, keypad, touchscreen, or pointing device enabling selection of visually presented objects, microphone for spoken commands, or other input devices), and/or to monitor what objects visually presented on the display 104 are selected by the user through operation of the controls 103. Such text and/or identifying information of selected objects are aggregated and stored as mobile device information 108 and/or user information 109.

The control circuit 101 may have also been caused, at an earlier time, to prompt the user for various pieces of personal information (e.g., name, address, contact information, a photographic image, etc.) that includes various biometric identifiable traits of the operator (e.g., visual, audio, physical, etc.), to derive personal or specific user information such as age and/or gender, and then to store such personal information in user information 109.

The control circuit analyzes mobile device information 108 and/or user information 109 to discern patterns of user activity, such as online activity. By way of example, the user of the mobile device 108 may make use of a website (e.g., server 203) providing online searches to search for information concerning a wide range of subjects, and patterns of such activity may be noted by the control circuit 101 and stored in mobile device information 108 and user information 109. Additionally or alternatively, the processor circuit analyzes mobile device information 108 and user information 109 to discern the subjects of online activities that are more recent than others, especially subjects that are connected to multiple instances of online activities. By way of example, the operator may have engaged in online activities earlier in the same day concerning multiple subjects, but with one particular subject at the focus of multiple online activities.

As will be familiar to those skilled in the art, it is common for web browsers, email clients and/or other routines typically employed by persons engaging in online activities to locally store data that maintains a record of aspects of those online activities (e.g., so-called "cookies"). Further, the control circuit may cause the user's keystrokes and/or the identities of visually displayed objects that are selected by the user to be stored as mobile device information 108 and user information 109.

In an alternative embodiment, a mobile device comprises a control circuit 101 and a storage unit 102 communicatively coupled to the control circuit 101, where the storage unit 102 is arranged to store a prediction component 106 operative on the control circuit 101. The control circuit 101 is caused to create a user activity graph 107 based on a set of user information 109 and a set of mobile device information 108. The control circuit 101 is further caused to receive at least one global subgraph 111 of a global graph 110. By combining at least a portion of the user activity graph 107 and the global subgraph 111, the prediction component 106 may generate a prediction of user activity.

In various other embodiments, multiple global subgraphs 111 may be derived from the global graph 110. One global subgraph 111 may be selected for each particular mobile device. Additionally, the global graph 110 may represent user activity from multiple user activity graphs 107, where each user activity graph 107 is associated with a different user or mobile device. The global subgraphs 111 may each represent a specific subset of user activity from the multiple user activity graphs 107 stored by the global graph 110.

Alternative embodiments include the mobile device receiving the global subgraph 111 from a database 112 communicatively coupled to the prediction component. In one embodiment, the database 112 may be implemented as a local database that is part of the mobile device executing the prediction component 106. In one embodiment, the database may be implemented as a remote database that is part of an electronic device separate and apart from the mobile device executing the prediction component 106, such as another mobile device or a server (e.g., server 203). FIG. 2 shows an embodiment where the database 112 is implemented on server 203.

Also, the mobile device may send all or portions of a user activity graph 107 to the database 112. The global graph 110 may be updated with all or portions of this user activity graph 107. In other various embodiments, there may be multiple mobile devices (e.g., mobile devices 200-202), each sending a user activity graph 107, or portions thereof, to be used for updating the global graph 110, such as a global graph 110 stored by a database 112 accessible via the server 203.

In other embodiments, the global graph comprises one or more nodes and multiple edges. The nodes may be derived from product-keyword associations as described above. The distance between the edges may be normalized. Because the edges between different nodes may be based on different categories of similarity, a normalization factor must be provided so that the distances can be compared. A simplified example would be where there are two edges and one uses inches and the other metric units. A more complex example would be where one of the edges relates to reading a magazine and the other relates to jogging in the park for 10 minutes. Various embodiments may also use some or all of the normalized distances in selecting a global subgraph 111.

In other embodiments, the mobile device may comprise a memory, a transceiver, one or more antennas, and a display. For example, as discussed above, the mobile device may wirelessly send and/or transmit information using the transceiver. Another example is that the memory is used to store user information and mobile device information. Alternative embodiments include a mobile device with one or more antennas. The wireless antennas may help, for example, to transmit and/or receive user information or mobile device information. In other embodiments, the mobile device may include a display. The display may be used, for example, to display a user interface for playing games, surfing the web, and/or controlling the mobile device.

In further embodiments, the storage unit 102 may store a user interface component 105 operative on the control circuit 101 to present the user activity on the display 104. For example, if the user is in a shopping mall, the interface component 105 may display a question to the user seeking information as to what the user wants to buy. If the answer is, for example, children's clothes, the user interface component may prompt the user for other information that would enable a more useful prediction and/or recommendation. An electronic device, such as a mobile computing device, may utilize the predicted user behavior to take subsequent actions, such as control device elements (e.g., power, settings, hardware, software, etc.), present user interface views for a software application, modify user interface views (e.g., present different controls), perform automated operations (e.g., authentication, authorization, payment, manage network connections, etc.), and other actions suitable for a mobile computing device.

In further embodiments, the prediction component 106 may generate and present one or more parameters associated with the predicted user activity. For example, if the user is shopping for a car, the prediction component 106 may generate the names of multiple auto dealers with phone, address, and map information. In this example, the prediction component 106 may also provide price comparisons, sale events and the like. In some cases, the predicted user behavior may have parameters associated with it, such as a time parameter to indicate a time frame within which the predicted user behavior may occur, a probability parameter to indicate a statistical probability that the predicted user behavior may occur, and so forth.

In further embodiments, the user activity predictions may be comprised of either or both of product or non-product recommendations, and these predictions may also be displayed to the user.

For example, if the user activity graph includes jogging activities, and other related information, the prediction component 106 may recommend purchasing new waterproof shoes for the upcoming rainy season, or new warmer socks for a cooler season. In another example, the prediction component may suggest that the user needs breakfast cereal, in particular oatmeal and corresponding products such as brown sugar.

In further embodiments, the user information includes user interactions with the mobile device. For example, the user information could include the times and durations that a user spends reading a particular e-book. This information might also include the users selection of brightness and font, and the use of any highlighting or commenting feature. Another example would be to include a user's progress on a favorite game in terms of scores and advancing levels, and the frequency and length of game playing sessions.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
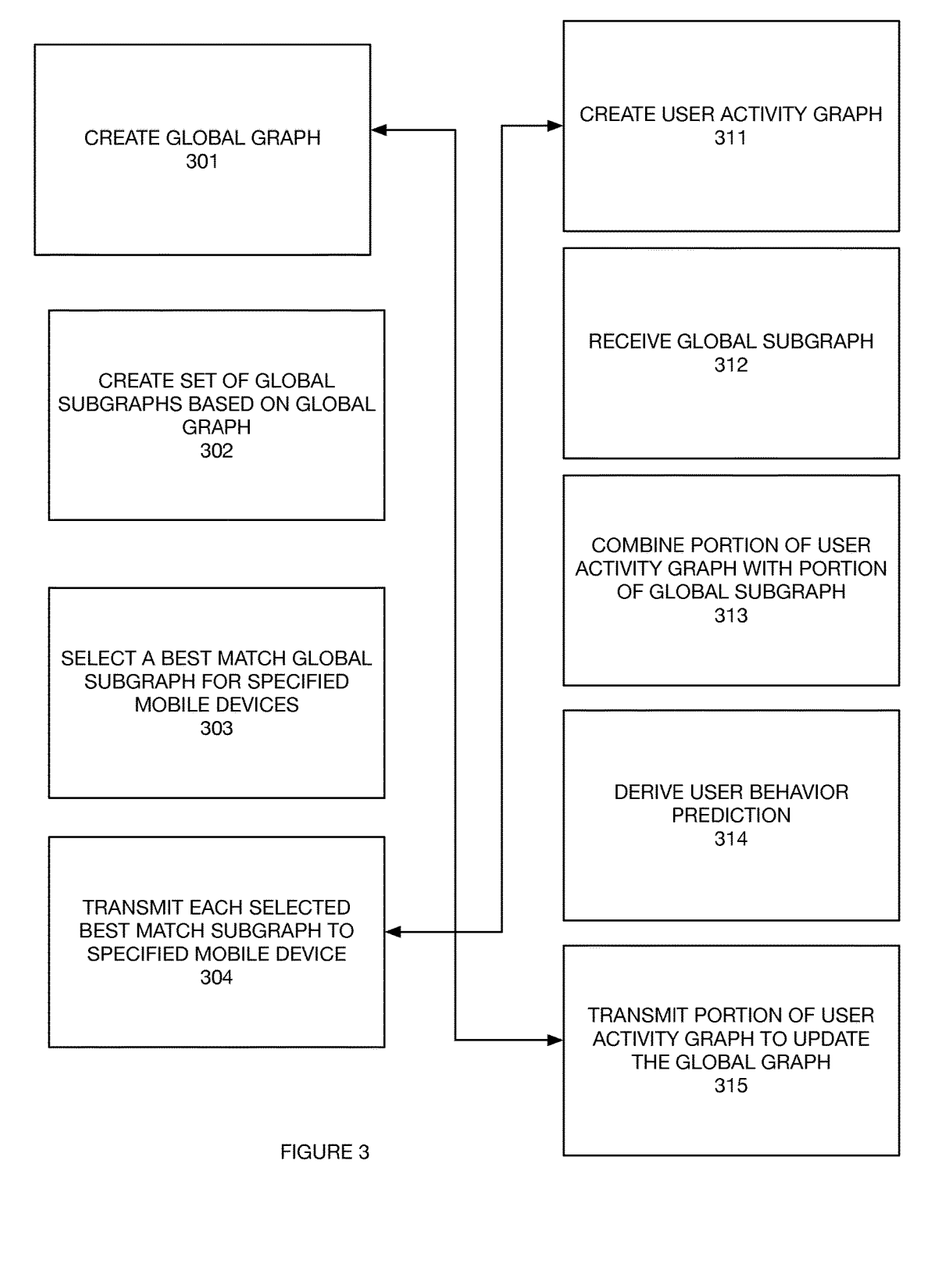
FIG. 3 is a flowchart of a first embodiment.

FIG. 3 shows one embodiment of a logic flow 300. The logic flow 300 may be representative of some or all of the operations executed by one or more embodiments described herein. For example, in block 301, the computing resource 203 creates a global graph. Then, in block 302, the computing resource creates a set of global subgraphs based on the global graph. In blocks 303 and 304, the computing resource selects, for each of a set of registered mobile devices, a particular global subgraph, and then transmits the corresponding particular global subgraph to each mobile device. As disclosed above, the nodes in the global graph and subgraphs include terms from the product-keyword associations. In order to find a common measure for the distance between nodes, the distances between the edges are normalized.

Continuing with the various embodiments as described, FIG. 3 also shows the mobile device at block 311 creating a user activity graph, and at block 312 receiving a global subgraph. Then in block 313, a portion of the user activity graph and the received global subgraph are combined, resulting in block 314, which is a prediction of user behavior. In these various embodiments, block 315 shows that a portion of the user activity graph is used to update the global graph.

Figure 4:
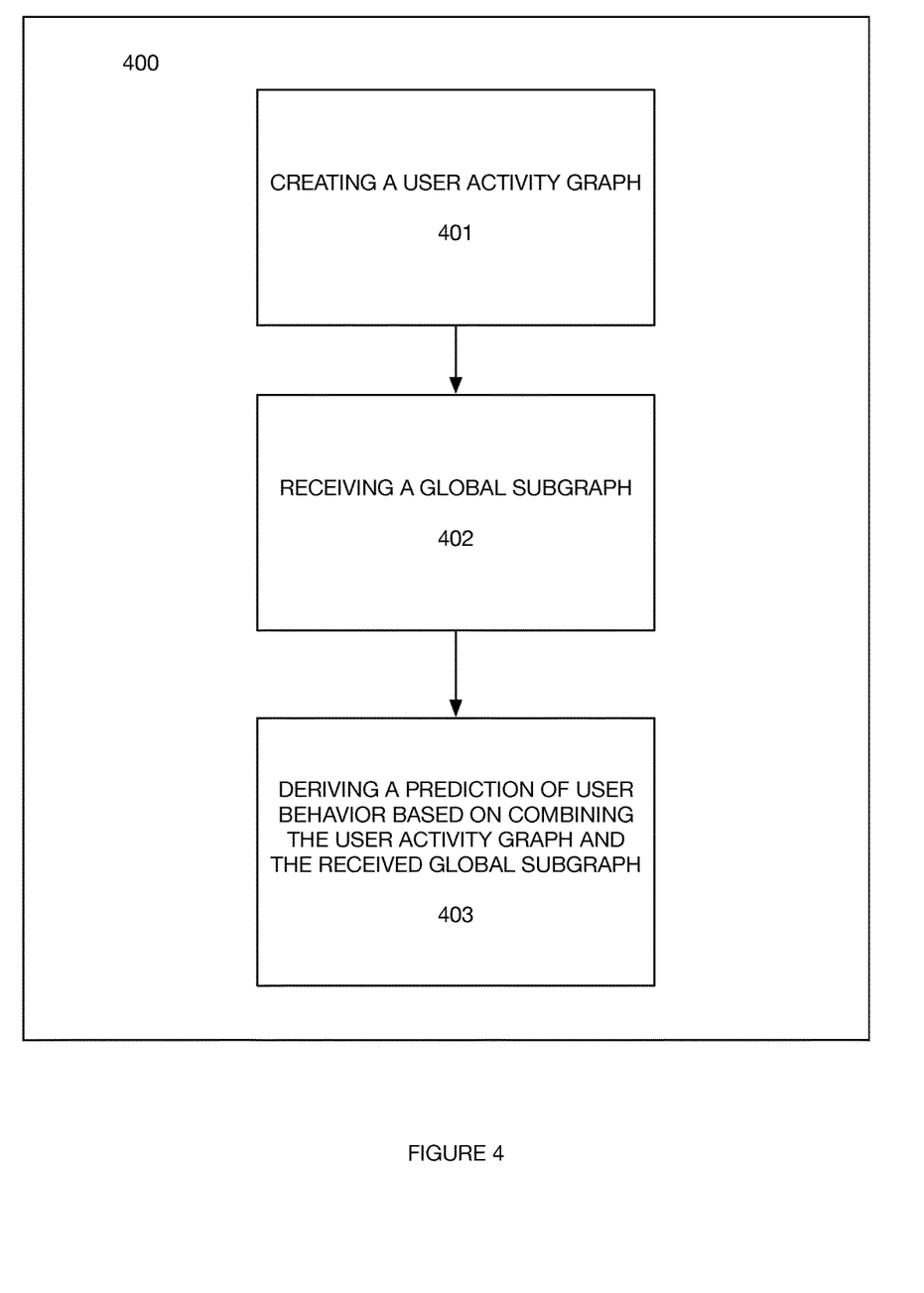
FIG. 4 is a flowchart of a second embodiment.

FIG. 4 shows an embodiment of another logic flow 400. The logic flow 400 may be representative of some or all of the operations executed by one or more embodiments described herein. For example, at block 401, the mobile device is creating a user activity graph. At block 402, the mobile device is receiving a global subgraph. At block 403, the mobile device is deriving a prediction of user behavior based on combining the user activity graph and the received global subgraph.

In one embodiment, the product-keyword association may be created by compiling product reviews available on various Internet sites such as Amazon.com®, Home Depot®, Sears®, or Costco®. The embodiments are not limited in this respect. Correlations and frequencies are used to derive weighting schemes. Similarly, other sources of information may be useful for creating product-keyword associations, such as may be available from the vendors Nielsen or Google, for example. Again, the embodiments are not limited in this respect.

Figure 5:
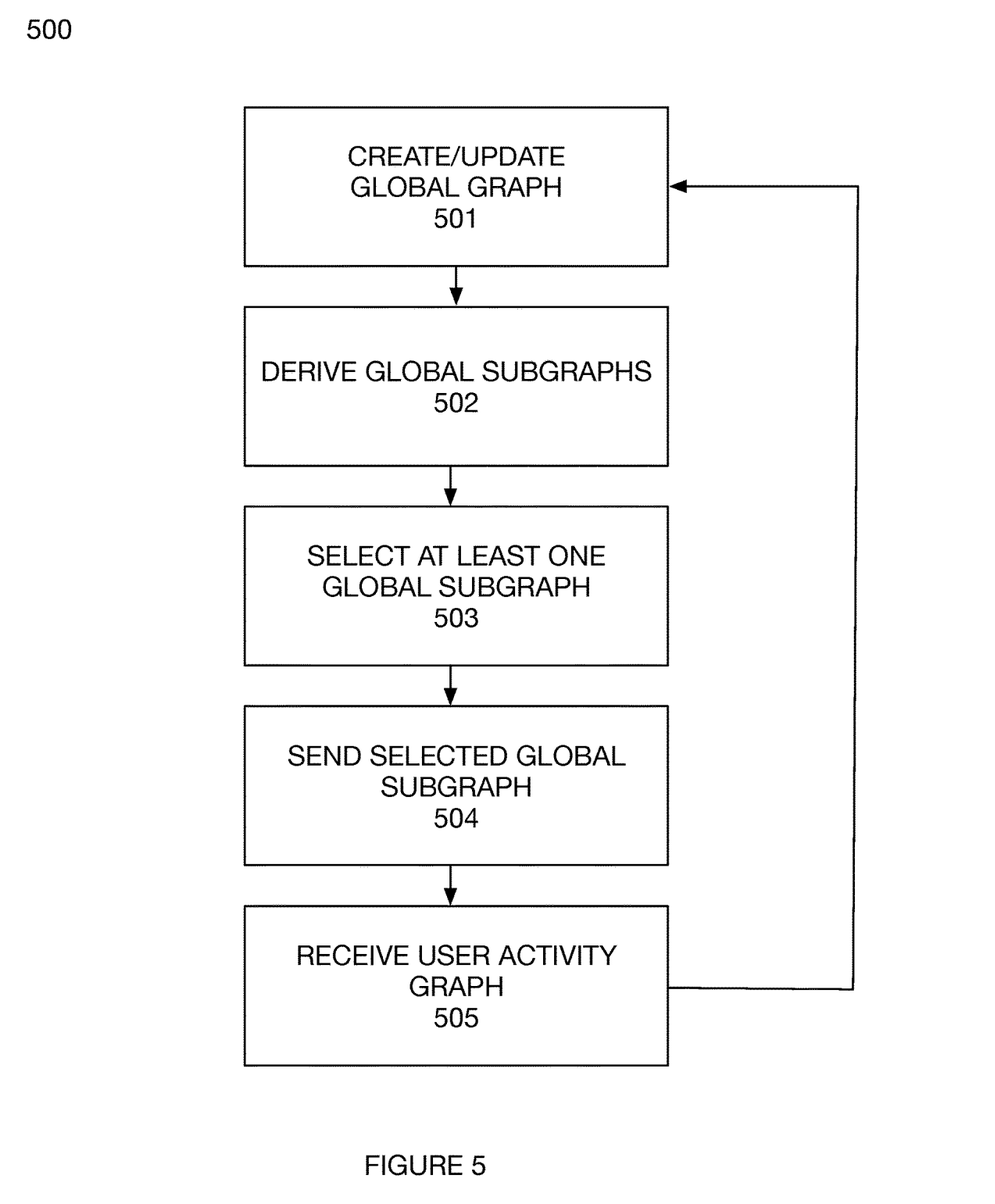
FIG. 5 is a flowchart of a third embodiment.

FIG. 5 shows an embodiment of another logic flow 500. This logic flow may proceed in, for example, but without limitation, server 203, as described above. In box 501 the global graph is created and/or updated. Then in box 502, a set of global subgraphs is derived from the global graph. In box 503 one of the global subgraphs is selected and in box 504 that subgraph is sent to a mobile device. In box 504, a user activity graph is received from a mobile device and used to create and/or update the global graph.

In other embodiments, multiple mobile devices send user activity graphs which are used to update the global graph. Correspondingly, in such embodiments, a global subgraph is selected for each mobile device and sent thereto.

Figure 6:
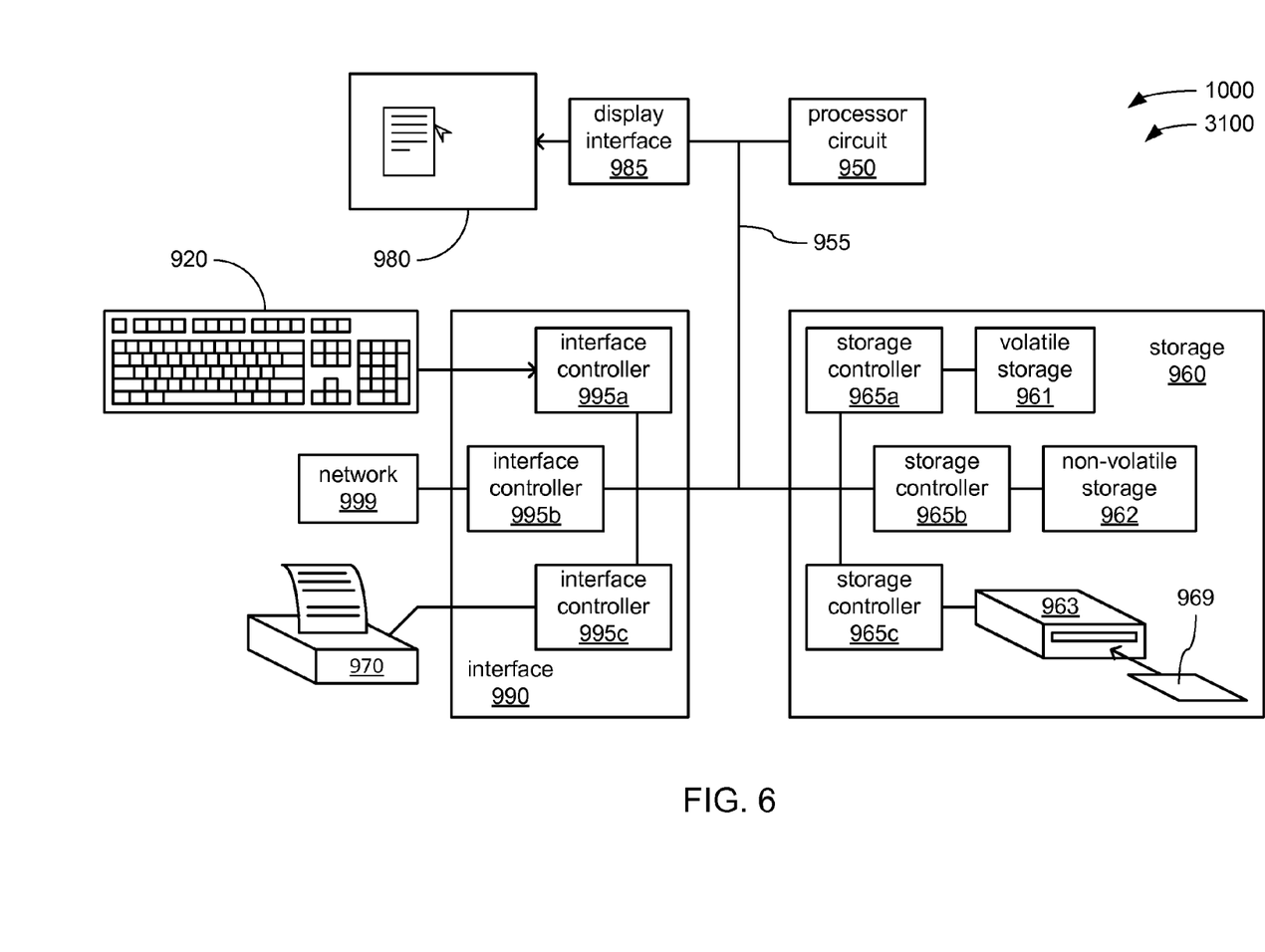
FIG. 6 is a block diagram of an embodiment of a processing architecture.

FIG. 6 illustrates an embodiment of an exemplary processing architecture 3100 suitable for implementing various embodiments as previously described. More specifically, the processing architecture 3100 (or variants thereof) may be implemented as part of one or more of the computing devices 100 and 200-203.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage unit 960, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 may comprise any of a wide variety of commercially available processors, employing any of a wide variety of technologies and implemented with one or more cores physically combined in any of a number of ways.

As previously discussed, the storage 960 may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

An embodiment relates to a computer storage product with a computer readable storage medium having computer code thereon for performing various computer-implemented operations. The media and computer code may be those specially designed and constructed for the purposes of the present embodiments, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment may be implemented using JAVA®, C++, or other object-oriented programming language and development tools. Another embodiment may be implemented in hard-wired circuitry in place of, or in combination with, machine-executable software instructions. More generally, the various elements of the computing devices 100 and 200-203 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A mobile device comprising:
a control circuit;
a storage unit communicatively coupled to the control circuit, the storage unit to store a prediction component operative on the control circuit to:
create a user activity graph based on a set of user information and a set of mobile device information;
receive a global subgraph from a server coupled to the mobile device via a network; and
derive a prediction of user activity based on combining at least a portion of the user activity graph and the global subgraph.

2. The mobile device of claim 1, the global subgraph to comprise one of a set of global subgraphs created from a global graph.

3. The mobile device of claim 2, the global graph to comprise one or more nodes derived from product-keyword associations.

4. The mobile device of claim 3, the global subgraph to comprise at least one edge and multiple nodes, where a distance between the nodes is normalized.

5. The mobile device of claim 4, the normalized distance to be used to select the global subgraph.

6. The mobile device of claim 1, comprising a memory, transceiver, one or more antennas, and a display.

7. The mobile device of claim 1, the storage unit to store a user interface component operative on the control circuit to present the prediction of user activity on an electronic display.

8. A method for predicting a user behavior, comprising:
creating a user activity graph based on a set of user information and a set of mobile device information;
receiving, via a network, a global subgraph from a server, the global subgraph to be stored in a database accessible to the server; and
deriving a prediction of user activity based on combining at least a portion of the user activity graph and the global subgraph.

9. The method of claim 8, the global subgraph to comprise one of a set of global subgraphs created from a global graph.

10. The method of claim 9, the global graph to comprise one or more nodes derived from product-keyword associations.

11. The method of claim 10, the global subgraph to comprise one edge and multiple nodes, where a distance between the nodes is normalized.

12. The method of claim 8, the global subgraphs being based on the normalized distance.

13. The method of claim 8, comprising displaying the user prediction on a display.

14. A non-transient computer readable storage medium containing executable instructions to:
create a user activity graph based on a set of user information and a set of mobile device information;
receive, via a network, a global subgraph from a server, the global subgraph to be stored in a database accessible to the server; and
derive a prediction of user activity based on combining at least a portion of the user activity graph and the global subgraph.

15. The non-transient computer readable storage medium of claim 14, the global graph to comprise one or more nodes derived from product-keyword associations.

16. The non-transient computer readable storage medium of claim 15, the global subgraph to comprise at least one edge and multiple nodes, where a distance between the nodes is normalized.

17. The non-transient computer readable storage medium of claim 16, the normalized distance to be used to select the global subgraph.

18. The non-transient computer readable storage medium of claim 14, further comprising instructions to present the user activity on an electronic display.

19. The non-transient computer readable storage medium of claim 18, the prediction of user activity to include a product recommendation.

20. The non-transient computer readable storage medium of claim 18, the prediction of user activity to include a non-product recommendation.

21. The mobile device of claim 1, the global subgraph comprising indications of a plurality of user activity graphs, each of the plurality of user activity graph based on different sets of user information and different sets of mobile device information.

22. The mobile device of claim 21, the set of user information comprises indications of at least one of the user's name, a user's browsing history, a quantity of emails the user receives on the mobile device, a quantity of emails the user sends on the mobile device, a quantity of text messages the user receives on the mobile device, a quantity of text messages the user sends of the mobile device, or a shopping history of the user on the mobile device.

23. The mobile device of claim 21, the set of mobile device information comprises indications of at least one of a temperature, an ambient light level, a location, system setting, or an installed application.

* * * * *